United States Patent [19]

Bolton

[11] Patent Number: 4,499,710
[45] Date of Patent: Feb. 19, 1985

[54] JET POWER LAWN MOWER

[76] Inventor: John D. Bolton, 5 Shiloh Cir., Irvine, Calif. 92714

[21] Appl. No.: 578,498

[22] Filed: Feb. 9, 1984

[51] Int. Cl.³ .............................................. A01D 35/262
[52] U.S. Cl. ...................................... 56/11.9; 56/229; 56/255; 56/295
[58] Field of Search ................ 56/11.9, 255, 229, 295, 56/17.5

[56] References Cited

U.S. PATENT DOCUMENTS

| | | | |
|---|---|---|---|
| 2,924,929 | 2/1960 | Albertson et al. | 56/11.9 |
| 2,934,876 | 5/1960 | Perrino | 56/11.9 |
| 3,087,295 | 4/1963 | Grupp | 56/11.9 |

Primary Examiner—Jay N. Eskovitz

[57] ABSTRACT

The invention consists of a tank of compressed air which is controllably allowed to escape through two nozzle cones mounted on the tips of a rotary power mower blade. What is new is an air driven power lawn mower.

1 Claim, 1 Drawing Figure

JET POWER LAWN MOWER

FIELD OF THE INVENTION

This apparatus relates to lawn mowers and more particularly to a lawn mower with a compressed air power source.

DESCRIPTION OF THE PRIOR ART

Lawn mowers currently available are operated by gasoline or by electricity. Gasoline operated mowers are very noisy and take too much maintenance. They also subject the user to the hazard of storing gasoline. Electric mowers are quiet and trouble free but the user is very limited by the length of cord. He must be very careful not to run over it. With these mowers the user is always standing damp ground and electric shock is always a hazard.

SUMMARY OF THE INVENTION

The invention consists of a tank of compressed air which is controllably allowed to escape through two nozzle cones mounted on the tips of a rotary power mower blade.

The object of the invention is to offer a lawn mower that is less expensive to manufacture, has a low noise level, is not limited by a cord and has a less hazardous fuel.

DESCRIPTION OF THE PREFERRED EMBODIMENT

Figure 1:
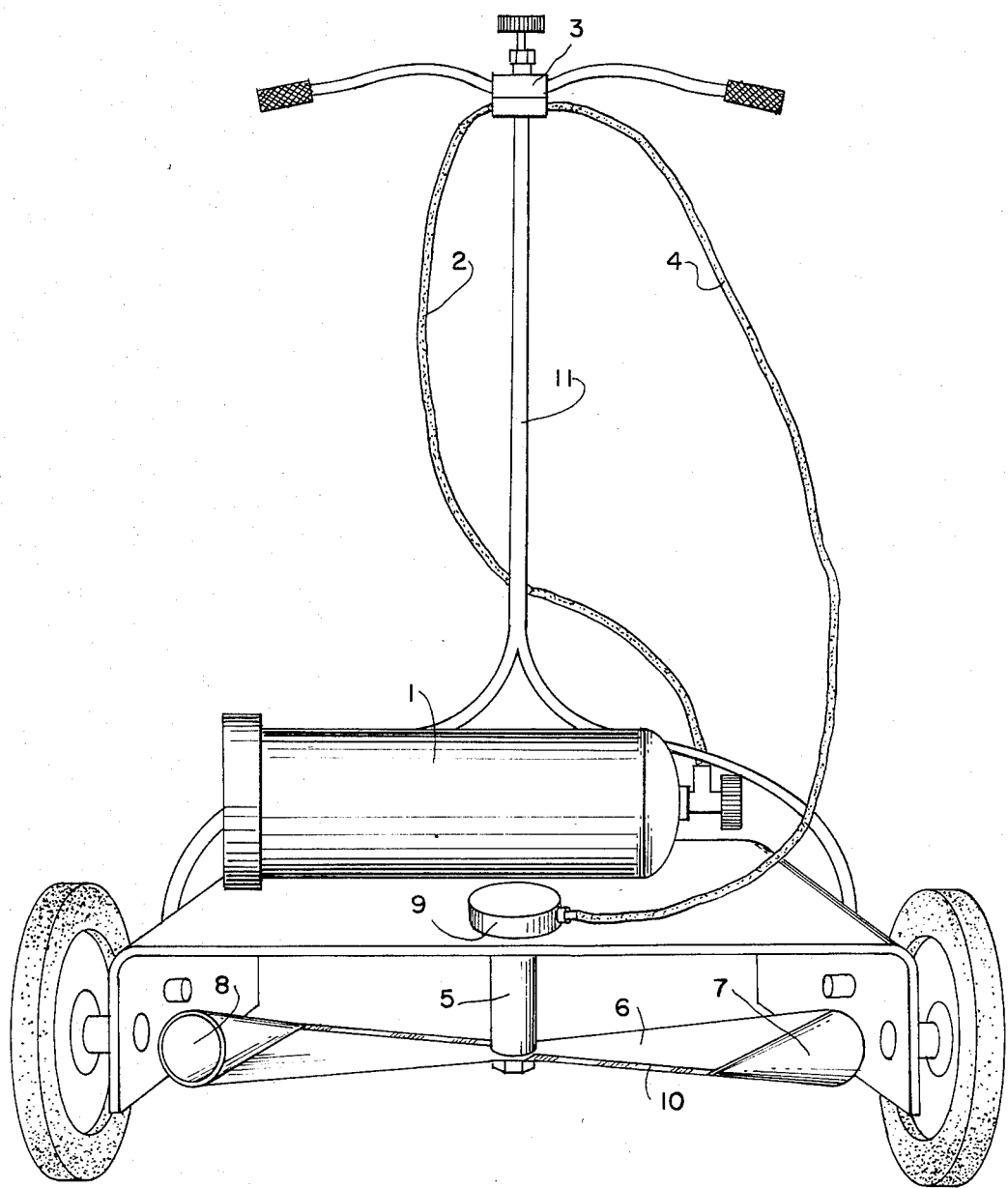
FIG. 1 is a cut away view of the jet mower.

In describing one selected embodiment of my invention illustrated in the drawing, specific terminology is resorted to for the sake of clarity; however, it is not intended to be limited to the specific terms so selected and it is to be understood that each specific term includes all technical equivalents which operate in a similar manner to accomplish a similar purpose.

Turning now to the specific embodiment of my invention selected for illustration, in FIG. 1, 1 is a tank of compressed air,
2 is an air line to mower handle,
3 is a valve in the handle,
4 is an air return line to blade,
5 is blade axle,
6 is blade,
7 is jet cone,
8 is jet cone opening,
9 air feed to axle swivel,
10 air feed line to jet cone.

OPERATION OF THE APPARATUS

The user fills the tank with compressed air from a remote pump. He may have several tanks ready to use.

To cut the grass he opens the valve which allows the compressed air to feed down the line 4 through the swivel 9, down the axle 5 and out to the jet cones 7. It rushes from the jets which creates a force that rotates the blade which cuts the grass. The user cuts the grass in the ordinary way. If he notices he is losing power he can either switch tanks or refill the tank that he has.

The advantage of my invention is that this mower is less expensive to manufacture than either an electric mower or a gasoline engine powered one. Another advantage is that it is quiet. Another advantage is that the user need not store hazardous fuel. Another advantage is that the user is not bound by a cord and does not incur the risk of electric shock or the risk of running over the cord.

It is to be understood that the form of my invention selected for illustration here and described herein is to be taken as a preferred embodiment. For example, any sort of power control valve or system may be used. The power source is not limited to compressed air but may be any compressed gas. There may be any number of blades and number of jet cones. The jet release cones need not be on the blade but may be mounted above the blade compartment.

Having thus described and disclosed my invention I claim:

1. A lawn mower comprising a wheel-supported mower deck, a blade rotatively supported within said deck, said blade including a forward cutting portion and jet cones at each end, a reservoir of compressed gas mounted on said deck, conducting tubes extending between said reservoir and said jet cones for directing gas from said reservoir to said cones, and control means for actuating the release of gas from said reservoir to said cones with the gas release through said cones causing said blade to rotate and cut grass.

* * * * *